(12) United States Patent
Tacon (10) Patent No.: US 9,796,457 B2
(45) Date of Patent: Oct. 24, 2017

(54) BUOYANT ELEMENT

(71) Applicant: Jonathan Rayner Tacon, Oaklands (ZA)

(72) Inventor: Jonathan Rayner Tacon, Oaklands (ZA)

(*) Notice: Subject to any disclaimer, the term of this patent is extended or adjusted under 35 U.S.C. 154(b) by 273 days.

(21) Appl. No.: 14/647,522

(22) PCT Filed: Nov. 13, 2013

(86) PCT No.: PCT/ZA2013/000085
§ 371 (c)(1),
(2) Date: May 27, 2015

(87) PCT Pub. No.: WO2014/085833
PCT Pub. Date: Jun. 5, 2014

(65) Prior Publication Data
US 2015/0307163 A1   Oct. 29, 2015

(30) Foreign Application Priority Data
Nov. 28, 2012  (ZA) ................................ 2012/08967

(51) Int. Cl.
| | |
|---|---|
| *B63B 9/06* | (2006.01) |
| *B29C 41/20* | (2006.01) |
| *B63B 35/38* | (2006.01) |
| *B29C 41/04* | (2006.01) |
| *B29K 105/04* | (2006.01) |

(52) U.S. Cl.
CPC .............. *B63B 35/38* (2013.01); *B29C 41/04* (2013.01); *B29C 41/20* (2013.01); *B63B 9/06* (2013.01); *B29K 2105/046* (2013.01)

(58) Field of Classification Search
CPC ...................................................... B63B 35/38
USPC ........................................................ 114/77 R
See application file for complete search history.

(56) References Cited

U.S. PATENT DOCUMENTS

| | | | | |
|---|---|---|---|---|
| 4,488,833 A | * | 12/1984 | Perry | ...................... E01C 5/005 14/27 |
| 6,381,792 B1 | * | 5/2002 | Woodfin | ................. E01D 15/14 14/2.6 |
| 6,831,792 B2 | | 12/2004 | Nishida | |
| 7,481,176 B2 | * | 1/2009 | Pratt | ...................... B63B 35/34 114/264 |

(Continued)

FOREIGN PATENT DOCUMENTS

| | | |
|---|---|---|
| CN | 2061926 | 9/1990 |
| CN | 102616341 | 8/2012 |

(Continued)

OTHER PUBLICATIONS

Search Report and Written Opinion for International Application No. PCT/ZA2013/000085 dated Feb. 3, 2014.

*Primary Examiner* — Lars A Olson
*Assistant Examiner* — Jovon Hayes
(74) *Attorney, Agent, or Firm* — Haugen Law Firm PLLP (57) ABSTRACT

A buoyant element includes an elongate buoyant body that defines: (i) a major side; (ii) a minor side that is parallel to the major side; (iii) axial ends connecting the major and minor sides at an angle of substantially 45° from the orthogonal spanning the major and minor sides; and (iv) means for connecting adjacent buoyant elements together. The length of the major side is twice the length of the minor side.

19 Claims, 5 Drawing Sheets

(56) References Cited

U.S. PATENT DOCUMENTS

2012/0227653 A1* 9/2012 Widmer .................... B63B 5/24
    114/85
2015/0307163 A1* 10/2015 Tacon .................... B63B 35/38
    114/77 R

FOREIGN PATENT DOCUMENTS

DE           1809928       6/1970
WO    WO 2014085833 A1 *  6/2014  ............. B63B 35/38
WO    WO 2015060783 A1 *  4/2015  ............. B63B 35/44

* cited by examiner

BUOYANT ELEMENT

BACKGROUND

The present invention relates to a buoyant element. More specifically, the present invention relates to a buoyant element with integral male and female connectors for axially connecting adjacent elements together either linearly or orthogonally.

Various buoyant elements are known. For example:

U.S. Pat. No. 4,409,921 "Floating inspection platform" and U.S. Pat. No. 4,798,169 "Plant for fish farming in the open sea" describe hexagonal structures comprising a series of floating elements with sides angled at 60°;

U.S. Pat. No. 7,182,034 "Offshore floating dock" illustrates trapezoidal elements with sides angled at 15° from the orthogonal spanning the parallel sides;

U.S. Pat. No. 6,381,792 "Modular foam floating bridge" illustrates trapezoidal elements with sides angled at 35° from the orthogonal spanning the parallel sides. Furthermore, according to the description at column 3, line 21: "[the plane of each end piece has] an acute angle on the order of 30° and 60° . . . "; and EP1,280,695 "Temporary floatation stabilization device and method" illustrates trapezoidal pontoons with ends angled at 45° such that, if connected end-to-end, the pontoons would form a square.

It is an object of the present invention is to provide a buoyant element that is modular, homogeneous and includes integral means for connecting adjacent buoyant elements together.

SUMMARY OF THE INVENTION

According a preferred embodiment of the present invention, a buoyant element includes:
an elongate buoyant body that defines:
  a major side;
  a minor side that is parallel to the major side;
  axial ends connecting the major and minor sides at an angle of substantially 45° from the orthogonal spanning the major and minor sides; and
  means for connecting adjacent buoyant elements together,
wherein the length of the major side is twice the length of the minor side.

Typically, the elongate buoyant body is in cross section: (i) a square; (ii) a rectangle; (iii) a circle; or (iv) two half-circles connected by linear sections.

Generally, the connecting means connect axial ends of adjacent buoyant elements together.

Preferably, the connecting means comprises: (i) an integral male connector at one axial end; and (ii) an integral female connector at the other axial end, each connector being sized and shaped such that the male connector can be slidably received and captured within a female connector on an adjacent buoyant element to connect buoyant elements together.

Typically, the male connector includes a neck extending from the axial end and an enlarged head at its free end.

Generally, the male connector is symmetrical about a plane that: (i) runs from the axial end along the centre of the neck and head; and (ii) extends midway between the major and minor sides, and the plane extending through the male connector is orthogonal to the plane defined by the axial end.

Typically, the female connector comprises a cavity with a constriction at its opening.

Generally, the female connector is symmetrical about a plane that: (i) runs from the axial end along the centre of the constriction and cavity; and (ii) extends midway between the major and minor sides, and the plane extending through the female connector is orthogonal to the plane defined by the axial end.

Typically, the cavity is open at one end and extends through the centre of the elongate buoyant body, equidistant from the major and minor sides.

Preferably, the major and minor sides are both located on a line running though the longitudinal axis of the elongate buoyant body, and the longitudinal axis of the cavity is orthogonal to the line on which the major and minor sides are located.

Typically, the cross-sectional profile of the cavity is constant along its length.

Generally, the male connector is elongate, and the longitudinal axis of the male connector is parallel to the longitudinal axis of the cavity.

Conveniently, the connector means are puzzle-shaped.

Preferably, each axial end is substantially planar such that, when connected to each other, adjacent buoyant elements are in facial contact along their axial ends.

Optionally, the buoyant element further includes at least one tab extending from each of the major and minor sides.

Typically, each tab defines an aperture therethrough. And, each aperture is between 15 mm and 20 mm in diameter.

Optionally, each of the minor and major sides includes four parallel, axially extending series of tabs. Preferably, the width of each tab is 30 mm and the inner parallel series of tabs are spaced to define a 45 mm gap therebetween, whereas the outer parallel series of tabs are spaced to define a 120 mm gap therebetween. The tabs in each series of tabs may be spaced from each other to define gaps between neighbouring tabs that correspond to the length of a tab. Furthermore, the tabs in the inner series of tabs may aligned. Similarly, the tabs in the outer series of tabs may be aligned. Preferably, (i) the tabs in the inner series of tabs; and (ii) the tabs in the outer series of tabs, are staggered.

When buoyant elements are arranged with the minor side of a first buoyant element adjacent the major side of a second buoyant element, the series of tabs on the minor side of the first buoyant element may locate between the series of tabs on the major side of the second buoyant element.

Conveniently, a bolt extends between the tabs on the first and second buoyant elements to connect them together.

Optionally, the elongate buoyant body defines a pair of bores extending radially through the elongate body, orthogonal to the line on which the major and minor sides are located.

Typically, the longitudinal axes of the bores are spaced the same distance as the length of the minor side.

Generally, the bores have a diameter between 50 mm and 110 mm and a pipe extends through each bore.

Optionally, the buoyant element further includes opposed ridges extending axially along the peripheral wall midway between the major and minor sides.

Preferably, each ridge defines a pair of parallel lateral sides to facilitate securing of a clamp on the ridge.

Generally, the buoyant element is homogeneous.

According a second embodiment of the present invention, a buoyant element includes:
an elongate buoyant body that defines:
  a major side;
  a minor side that is parallel to the major side;

axial ends connecting the major and minor sides at an angle of substantially 30° from the orthogonal spanning the major and minor sides; and means for connecting adjacent buoyant elements together, wherein the length of the major side is three times the length of the minor side.

According to a second aspect of the invention, there is provided a method of making a buoyant element according to the preferred or second embodiments of the invention, the method including the steps:

inserting a pipe into a mould;

charging the mould with a plastics material; and rotomolding the buoyant element within the mould from the plastics material, and incorporating the pipe into the buoyant element such that the pipe extends through each bore.

BRIEF DESCRIPTION OF THE DRAWINGS

The invention will now be described in more detail, by way of examples only, with reference to the accompanying drawings in which.

DESCRIPTION OF A PREFERRED EMBODIMENT

With reference to FIGS. 1 to 6 of the drawings, a buoyant element 10 according to a preferred embodiment of the invention includes an elongate, buoyant body 12, a major side 14, a minor side 16 and means 18 for connecting adjacent buoyant elements 10 together.

The above parts 12, 14, 16 and 18 of the buoyant element 10 are homogeneous and formed integrally from polyethylene, a polymer based compound, resin, polyurethane, PET, Styrene or polypropylene during a casting, roto-moulding or blow moulding process.

The body 12 could, in cross section, be a square, rectangle or circle. The FIGS. 1 to 6 show a body 12 comprising, in cross section two half-circles connected by linear sections. To ensure buoyancy, the body 12 is either hollow or filled with a polyurethane foam (or a similar closed-cell low-density material or foaming compound). Longitudinal axis A-A extends through the body 12.

Major and minor sides 14 and 16 extend axially along the radial peripheral wall of the body 12. The sides 14 and 16 are parallel to each other and to the longitudinal axis A-A.

The length of the major side 14 is twice that of the minor side 16.

Figure 4:
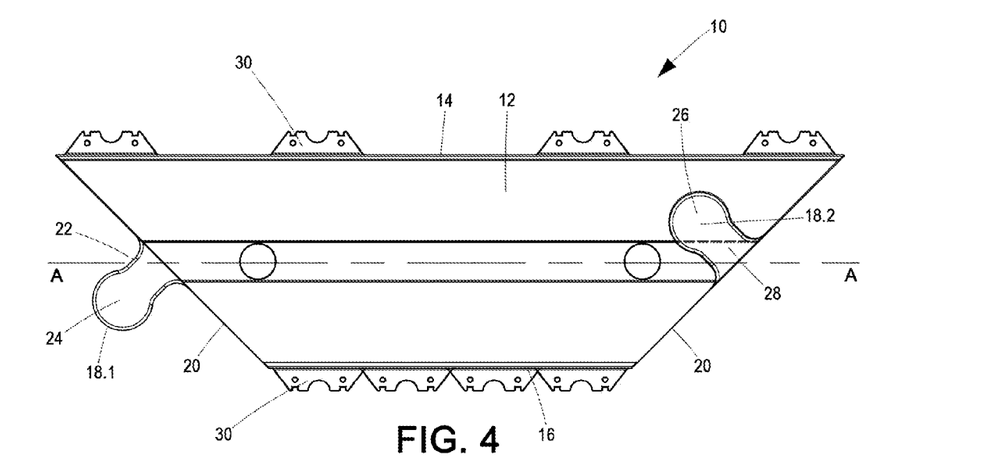
FIG. 4 is a side view of the buoyant element in FIG. 1 showing the female connector.

With particular reference to FIG. 4, planar axial ends 20 close the axial ends of the body 12, and are inclined at substantially 45° (i.e. between 42° and 48°) to the orthogonal spanning the major and minor sides 14 and 16. The body 12 is in the form of a symmetrical trapezoid with parallel major and minor sides 14 and 16 and axial ends 20 extending therefrom at 45°.

Figure 2:
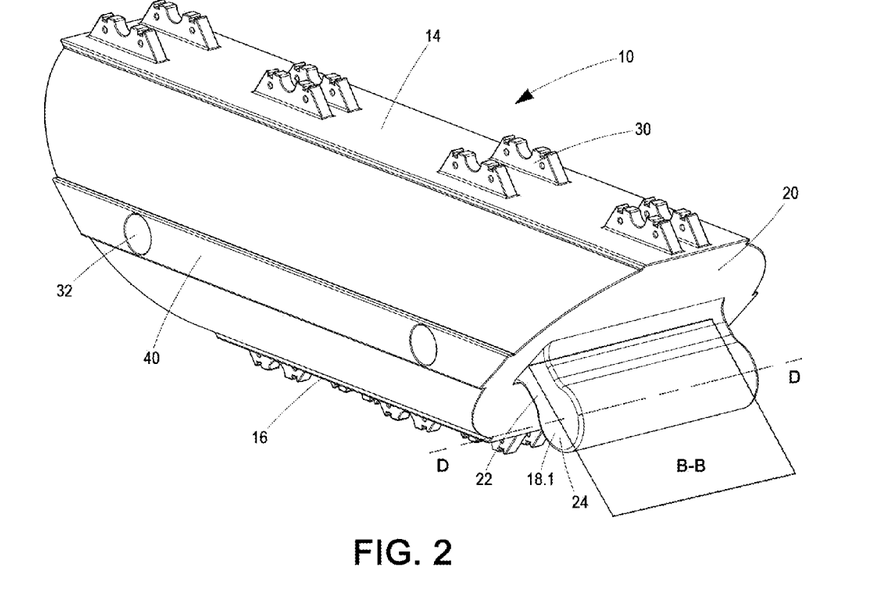
FIG. 2 is a second perspective view of the buoyant element in FIG. 1.
Figure 3:
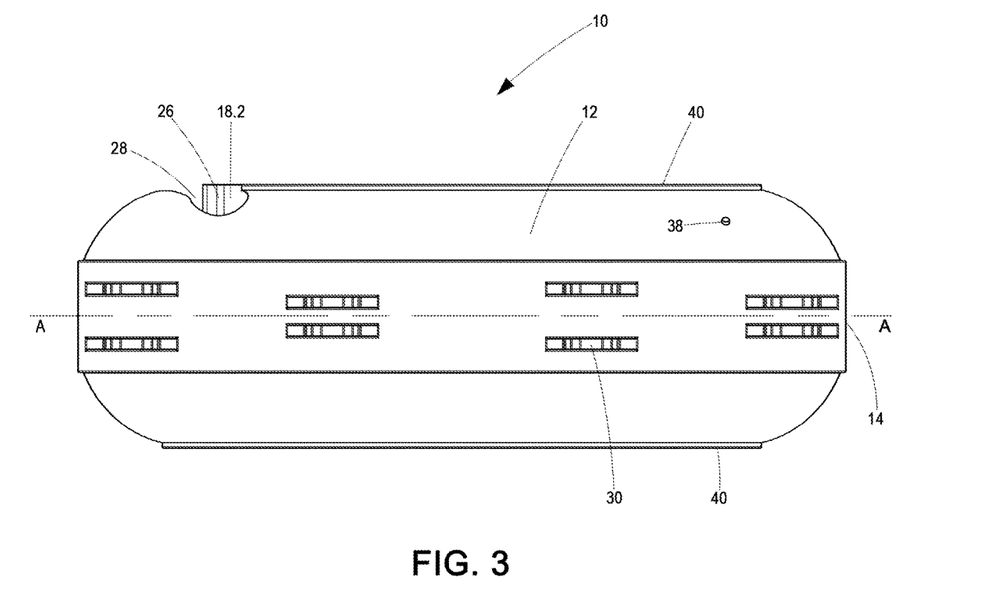
FIG. 3 is a top view of the buoyant element in FIG. 1.

Turning to FIGS. 2 and 4, puzzle-shaped connecting means 18 for connecting axial ends 20 of adjacent buoyant elements 10 together comprises an integral male connector 18.1 and an integral female connector 18.2. The male connector 18.1 includes a neck 22 that extends from the axial end 20 and terminates at its free end in an enlarged head 24. Plane B-B: (i) runs from the axial end 20 along the centre of the neck 22 and head 24; and (ii) extends from the axial end 20 midway between the major and minor sides 14 and 16. The male connector 18.1 is symmetrical about plane B-B. And, plane B-B is orthogonal to the planar axial end 20.

Figure 1:
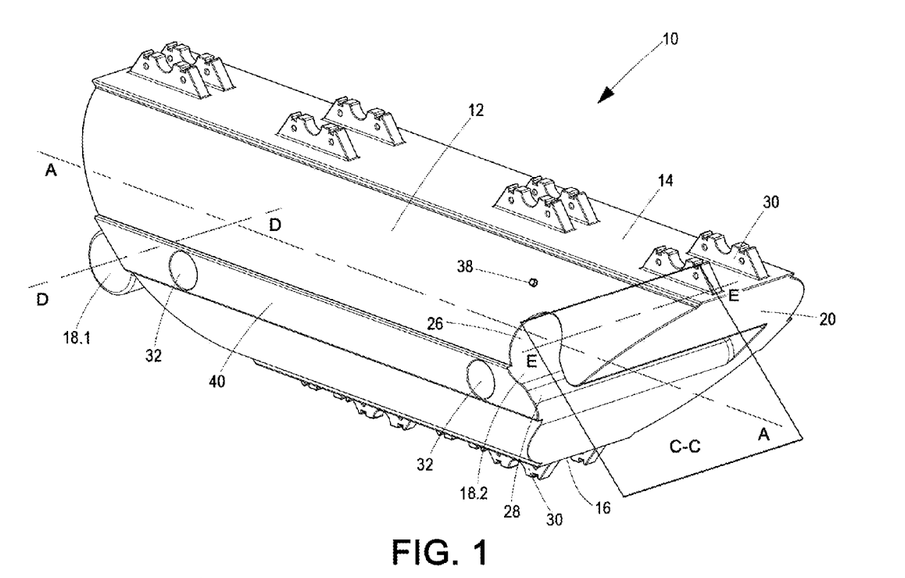
FIG. 1 is a first perspective view of a buoyant element according to a preferred embodiment of the present invention.

With reference to FIGS. 1 and 4, the female connector 18.2 comprises a cavity 26 defined by the axial end 20 with a constriction 28 at its opening. Plane C-C: (i) runs from the axial end 20 along the centre of the constriction 28 and cavity 26; and (ii) extends midway between the major and minor sides 14 and 16. The female connector 18.2 is symmetrical about plane C-C. And, plane C-C is orthogonal to the planar axial end 20. The cavity 26 extends along the axial end 20 and is open at one axial end—extending through an aperture defined by the radial peripheral wall of the body 12. The male connector 18.1 is also elongate, with its longitudinal axis D-D extending parallel to the longitudinal axis of the cavity 26 E-E.

The male and female connectors 18.1 and 18.2 are sized and shaped such that the male connector 18.1 of one buoyant element 10 can be received within the female connector 18.2 of a second buoyant element 10 via the aperture defined by the radial peripheral wall of the body 12 and slid axially along the cavity 26 (i.e. along E-E)—the head 24 being captured within the cavity 26 while the neck 22 extends through the passage 28.

The shape and arrangement of the connecting means 18 is an improvement over existing linking systems using pins, as its puzzle-shape distributes stress over a larger area than would be the case if a locking pin (as described in prior art systems) were used to connect adjacent pontoons together. By distributing stresses, the risk of fatigue failure of the connecting means 18 is reduced. Furthermore, the closed axial wall of the cavity 26 limits relative movement of the male and female connectors 18.1 and 18.2 in one direction without the need to insert a locking pin.

Figure 6:
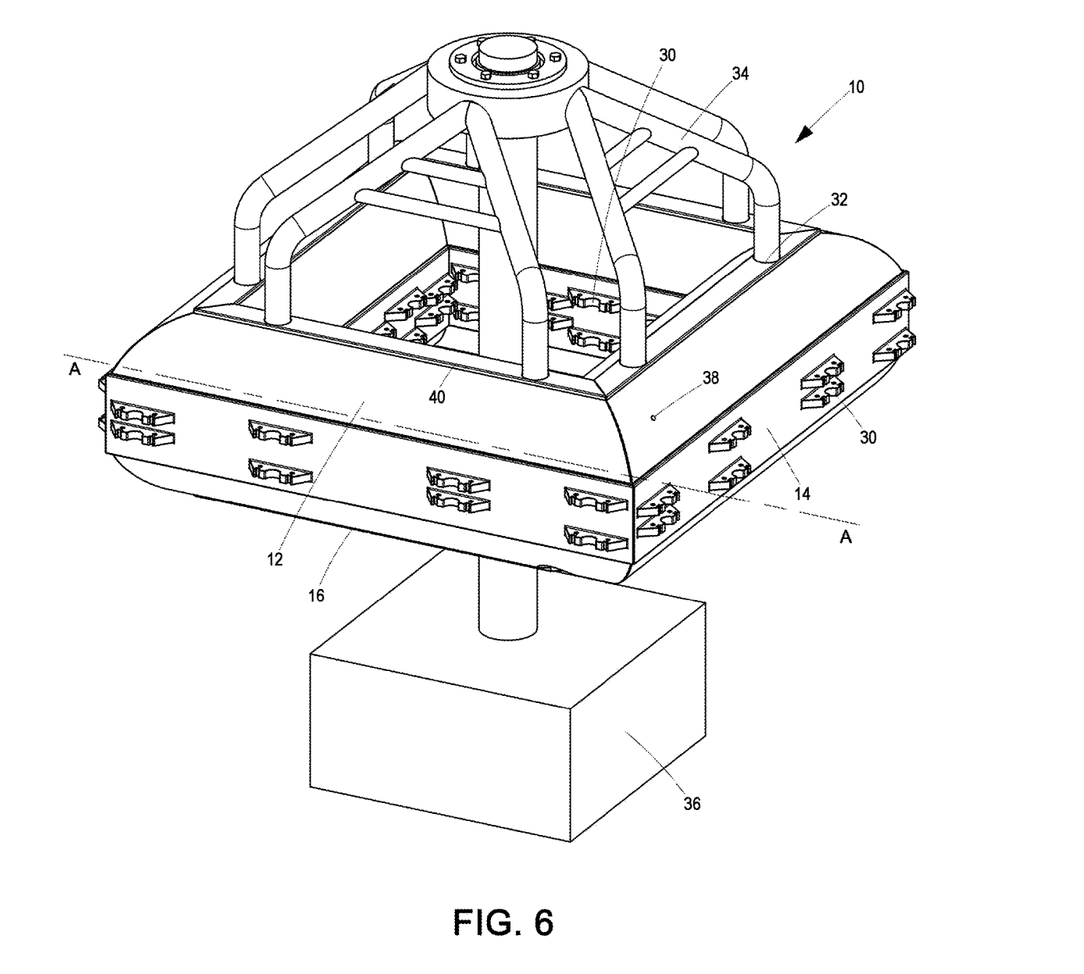
FIG. 6 is a perspective view of four buoyant elements in FIG. 1 attached to each other and a pipe framework extending through the bores to support a submerged pump.

With reference to FIG. 6, it will be appreciated that when the axial ends 20 of buoyant elements 10 are connected to each other, the planar sections of the axial ends 20 are in facial contact. This arrangement provides a rigid connection with little "play".

Each of the major and minor sides 14 and 16 includes four parallel, series of tabs 30 extending axially along the body. The width of each tab is 30 mm and the inner parallel series of tabs 30 are spaced to define a 45 mm gap therebetween, whereas the outer parallel series of tabs 30 are spaced to define a 120 mm gap therebetween. On the minor side 16, the tabs 30 in each series of tabs 30 are spaced from each other to define gaps between neighbouring tabs that correspond to the length of a tab.

On the major side 14, each tab 30 in the inner series of tabs is aligned with a tab 30 on the minor side 16, i.e. the paired tabs 30 are located orthogonal to the same point on the axis A-A. Similarly, on the major side 14, each tab 30 in the outer series of tabs is aligned with a tab 30 on the minor side 16, but the tabs 30 on the outer series of tabs 30 are staggered relative to the tabs 30 in the inner series of tabs 30.

In this arrangement, it will be appreciated that, should two buoyant elements 10 be arranged with the minor side 16 of a first buoyant element 10 adjacent the major side 14 of a second buoyant element 10, the parallel lines of tabs 30 on the minor side 16 of the first buoyant element 10 locates between the parallel lines of tabs 30 on the major side 14 of the second buoyant element 10. A bolt (not shown) inserted through the apertures in the overlapping tabs 30 secures the adjacent buoyant elements 10 together. A stringer (not shown) could also be located between the inner parallel lines of tabs 30 on the minor and major sides 16 to transfer forces between the tabs 30 and bolts.

Figure 5:
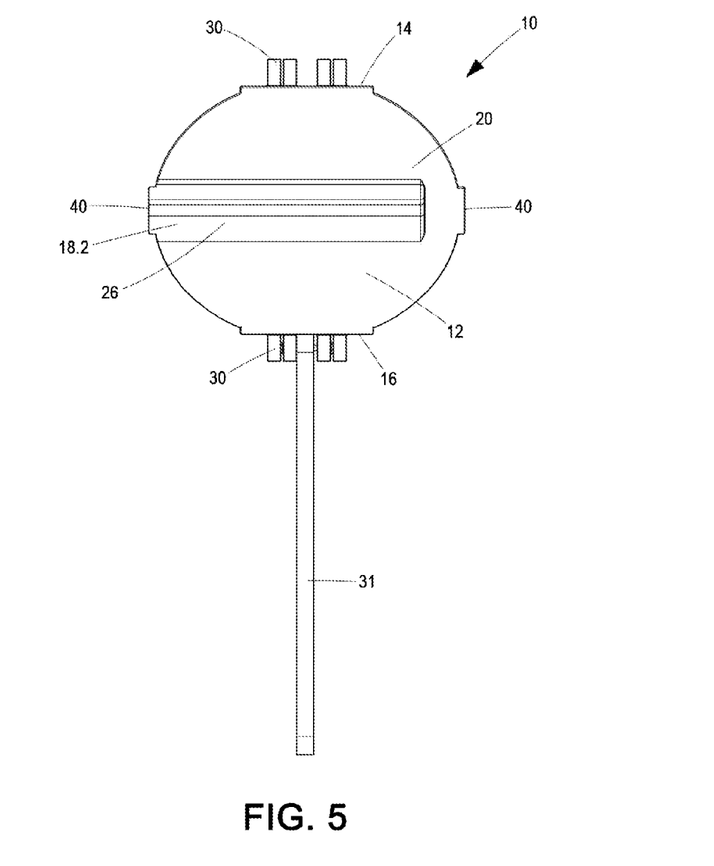
FIG. 5 is an end view of the buoyant element in FIG. 1 with plates secured to the tabs.

Alternatively, with reference to FIG. 5, the inner parallel lines of tabs 30 could be used to secure boards or plates 31 to the buoyant element 10 to act as a keel for a barge pontoon.

The body 12 also defines a pair of 50 mm to 110 mm internal diameter bores 32 extending radially therethrough in a direction orthogonal to the line spanning the major and minor sides 14. The longitudinal axes of the bores 32 are spaced the same distance as the length of the minor side 16. Referring to FIG. 6, a pipe framework 34 for supporting a submerged pump 36 can be secured to the buoyant elements 10 by extending the ends of the pipe framework 34 through the bores 32.

The buoyant element 10 also includes a valve 38 for controlling the inflow and/or outflow of air and/or water into/from the body 12, thereby to vary buoyancy of each buoyant element 10 independently.

A pair of opposed ridges 40 extend axially along the peripheral wall midway between the major and minor sides 14 and 16. Each ridge 40 defines a pair of parallel lateral sides to facilitate securing of a clamp (not shown) on the ridge 40.

It will be appreciated that when four buoyant elements 10 are connected to each other, they provide a rigid structure suitable as a floating support, whether for a submerged pump, a deck or a fish farm plant. Alternatively, the buoyant elements 10 could be connected such that the elements 10 extend linearly. This configuration is specifically suited for use as modular pontoons for barges. Furthermore, since the major side 14 of each buoyant element 10 is generally less than 2.4 m, and the buoyant element typically weighs between 24 kg and 100 kg, they can easily be transported and assembled by manual labour without the need for cranes.

Although the FIG. 6 shows the submerged pump 36 rigidly suspended by a solid pipe, it will be appreciated that the submerged pump 36 is prefereably suspended by a chain.

Figure 7:
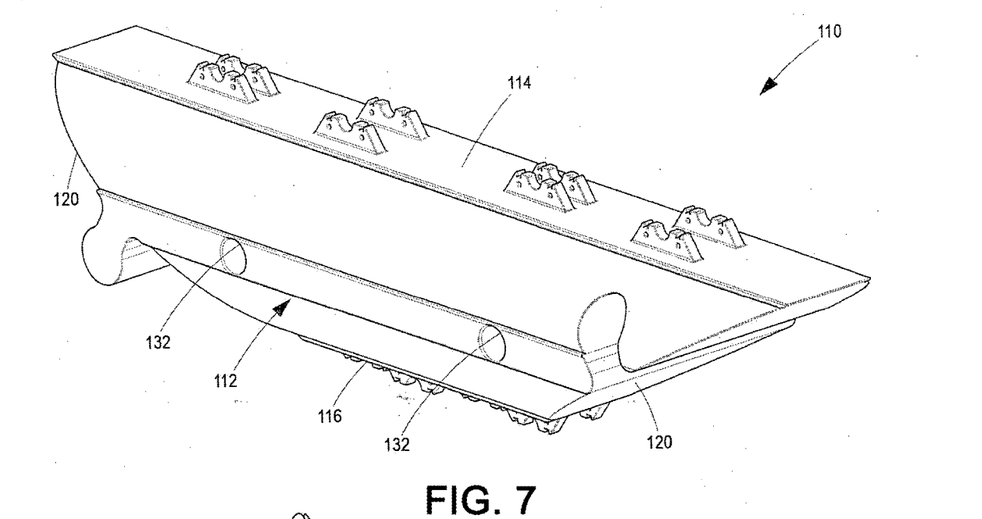
FIG. 7 is a first perspective view of a buoyant element according to a second embodiment of the invention.
Figure 8:
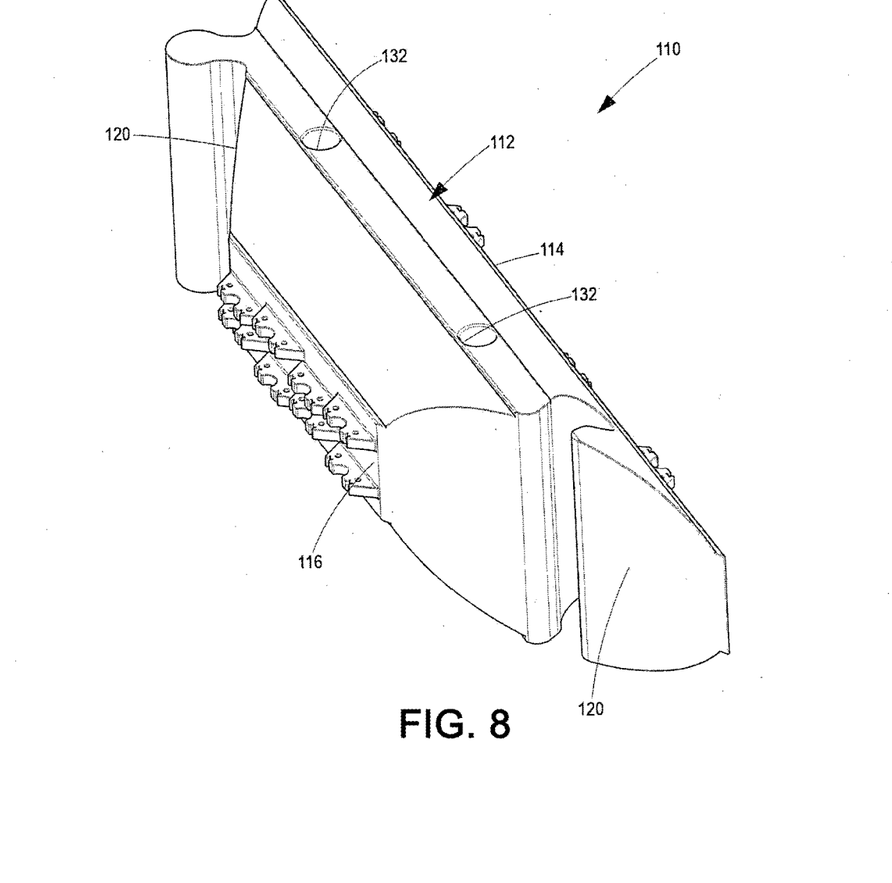
FIG. 8 is a second perspective view of the buoyant element in FIG. 7.

According to a second embodiment of a buoyant element 110 shown in FIGS. 7 and 8, the buoyant element 110 is similar to the buoyant element 10 according to the preferred embodiment of the invention. However, the length of the major side 114 is three times that of the minor side 116. And, the planar axial ends 120 are inclined at substantially 30° (i.e. between 27° and 33°) to the orthogonal spanning the major and minor sides 114 and 116. The body 112 is in the form of a symmetrical trapezoid with parallel major and minor sides 114 and 116 and axial ends 120 extending therefrom at 30°.

This buoyant element 110 is particularly suited to being arranged in a triangular formation.

According to a second aspect of the present invention, a method of making a buoyant element 10 or 110 according to either the preferred or the second embodiments of the invention includes the steps of:
  inserting a pipe into a mould;
  charging the mould with a plastics material; and
  rotomolding the buoyant element within the mould from the plastics material, and incorporating the pipe into the buoyant element 10 or 110 such that the pipe extends through each bore 32 or 132.

The invention claimed is:
1. A buoyant element including:
  an elongate buoyant body that defines:
    a major side;
    a minor side that is parallel to the major side;
    planar axial ends connecting the major and minor sides at an angle of substantially 45° from the orthogonal spanning the major and minor sides; and
    means for connecting adjacent buoyant elements together, the connecting means comprising: (i) an integral male connector at one axial end; and (ii) an integral female connector at the other axial end, each connector being sized and shaped such that the male connector can be slidably received and captured within a female connector on an adjacent buoyant element to connect buoyant elements together,
  wherein:
  (a) the male connector is symmetrical about a plane that: (i) runs from the axial end along the center of the neck and head; and (ii) extends midway between the major and minor sides;
  (b) the female connector is symmetrical about a plane that: (i) runs from the axial end along the center of the constriction and cavity; and (ii) extends midway between the major and minor sides; and
  both the plane extending through the male connector and the plane extending through the female connector are orthogonal to the plane defined by the axial end.

2. A buoyant element according to claim 1, wherein the elongate buoyant body is in cross section: (i) a square; (ii) a rectangle; (iii) a circle; or (iv) two half-circles connected by linear sections.

3. A buoyant element according to claim 2, wherein the connecting means connect axial ends of adjacent buoyant elements together.

4. A buoyant element according to claim 3, wherein: (i) the male connector includes a neck extending from the axial end and an enlarged head at its free end; and (ii) the female connector comprises a cavity with a constriction at its opening.

5. A buoyant element according to claim 4, wherein: (i) the cavity is open at one end and extends through the center of the elongate buoyant body, equidistant from the major and minor sides; and (ii) the cross-sectional profile of the cavity is constant along its length.

6. A buoyant element according to claim 5, wherein the male connector is elongate and a longitudinal axis of the male connector is parallel to a longitudinal axis of the cavity.

7. A buoyant element according to claim 6, wherein each axial end is substantially planar such that, when connected to each other, adjacent buoyant elements are in facial contact along their axial ends.

8. A buoyant element according to claim 7, further including at least one tab extending from each of the major and minor sides, and wherein each tab defines an aperture therethrough.

9. A buoyant element according to claim 8, wherein: (i) each aperture defined by the tabs is between 15 mm and 20 mm in diameter; (ii) each of the minor and major sides includes four parallel, axially extending series of tabs; (iii) the width of each tab is 30 mm; (iv) the inner parallel series of tabs are spaced to define a 45 mm gap therebetween; (v) the outer parallel series of tabs are spaced to define a 120 mm gap therebetween; (vi) the tabs in each series of tabs are spaced from each other to define gaps between neighbouring tabs that correspond to the length of a tab; (vii) the tabs in the inner series of tabs are aligned; (viii) the tabs in the outer series of tabs are aligned; and (ix) the tabs in the inner series of tabs on the one hand, and the tabs in the outer series of tabs on the other hand, are staggered.

10. A buoyant element according to claim 9, wherein, when buoyant elements are arranged with the minor side of a first buoyant element adjacent the major side of a second buoyant element, the series of tabs on the minor side of the first buoyant element locates between the series of tabs on the major side of the second buoyant element.

11. A buoyant element according to claim 10, wherein a bolt extends between the tabs on the first and second buoyant elements to connect them together.

12. A buoyant element according to claim 11, wherein: (i) the elongate buoyant body defines a pair of bores extending radially through the elongate body, orthogonal to the line on which the major and minor sides are located; (ii) the longitudinal axes of the bores are spaced the same distance as the length of the minor side; and (iii) the bores have a diameter between 50 mm and 110 mm.

13. A buoyant element according to claim 12, wherein a pipe extends through each bore defined by the elongate buoyant body.

14. A buoyant element according to claim 13, further including opposed ridges extending axially along the peripheral wall midway between the major and minor sides, and wherein each ridge defines a pair of parallel lateral sides to facilitate securing of a clamp on the ridge.

15. A buoyant element according to claim 14, wherein the buoyant element is homogeneous.

16. A buoyant element including:
an elongate buoyant body that defines:
   a major side;
   a minor side that is parallel to the major side;
   planar axial ends connecting the major and minor sides at an angle of substantially 60° from the orthogonal spanning the major and minor sides; and
   means for connecting adjacent buoyant elements together, the connecting means comprising: (i) an integral male connector at one axial end; and (ii) an integral female connector at the other axial end, each connector being sized and shaped such that the male connector can be slidably received and captured within a female connector on an adjacent buoyant element to connect buoyant elements together,
wherein:
(a) the male connector is symmetrical about a plane that: (i) runs from the axial end along the center of the neck and head; and (ii) extends midway between the major and minor sides;
(b) the female connector is symmetrical about a plane that: (i) runs from the axial end along the center of the constriction and cavity; and (ii) extends midway between the major and minor sides; and
both the plane extending through the male connector and the plane extending through the female connector are orthogonal to the plane defined by the axial end.

17. A buoyant element according to claim 16, wherein: (i) the elongate buoyant body defines a pair of bores extending radially through the elongate body, orthogonal to the line on which the major and minor sides are located; (ii) the longitudinal axes of the bores are spaced the same distance as the length of the minor side; (iii) the longitudinal axes of the bores are spaced the same distance as the length of the minor side; (iv) the bores have a diameter between 50 mm and 110 mm; and (v) a pipe extends through each bore.

18. A buoyant element according to claim 16, further including at least one tab extending from each of the major and minor sides, and wherein each tab defines an aperture therethrough.

19. A buoyant element according to claim 18, wherein: (i) each aperture defined by the tabs is between 15 mm and 20 mm in diameter; (ii) each of the minor and major sides includes four parallel, axially extending series of tabs; (iii) the width of each tab is 30 mm; (iv) the inner parallel series of tabs are spaced to define a 45 mm gap therebetween; (v) the outer parallel series of tabs are spaced to define a 120 mm gap therebetween; (vi) the tabs in each series of tabs are spaced from each other to define gaps between neighboring tabs that correspond to the length of a tab; (vii) the tabs in the inner series of tabs are aligned; (viii) the tabs in the outer series of tabs are aligned; and (ix) the tabs in the inner series of tabs on the one hand, and the tabs in the outer series of tabs on the other hand, are staggered.

* * * * *